United States Patent [19] [11] Patent Number: 4,550,504
Mehnert [45] Date of Patent: Nov. 5, 1985

[54] METHOD AND APPARATUS FOR THE MEASUREMENT OF THE LENGTH OF A STRAIGHT LINE OR AN ARC

[76] Inventor: Walter Mehnert, Grillparzerstr. 6, D-8012 Ottobrunn, Fed. Rep. of Germany

[21] Appl. No.: 452,376

[22] Filed: Dec. 22, 1982

[30] Foreign Application Priority Data

Dec. 29, 1981 [DE] Fed. Rep. of Germany ....... 3151798

[51] Int. Cl.$^4$ .............................................. G01B 11/02
[52] U.S. Cl. ..................................... 33/125 C; 364/562
[58] Field of Search ............... 33/125 A, 125 C, 1 PT, 33/125 R; 364/562, 561, 560, 559; 324/585 R; 356/395, 396

[56] References Cited

U.S. PATENT DOCUMENTS

| 3,170,100 | 2/1965 | Rantsch et al. | 33/125 C |
| 3,582,769 | 6/1971 | Brandenburg | 33/125 C |
| 4,158,509 | 6/1979 | Rieder et al. | 33/125 C |
| 4,226,024 | 10/1980 | Westerberg et al. | 33/125 C |
| 4,479,716 | 10/1984 | Nelle | 33/125 C |

Primary Examiner—William D. Martin, Jr.

[57] ABSTRACT

The measurement of the length of a straight line or an arc, traversed during relative movement of two bodies, and especially the measurement of the distance of a predetermined point on the first one of the two bodies, which point may be defined by providing a first marking on the first body, from at least one second marking which is one of a plurality of markings provided on a first marking carrier which is fixedly connected to the second of the two bodies, is made possible by imparting an oscillatory movement to a first sensor which is provided on the first body and scans the markings on the first marking carrier and generates a time significant signal at each crossing by the first sensor of the at least one second marking, by further generating a reference signal each time the first sensor moves through a predetermined position with respect to the first marking on the first body, measuring the time distance between at least one time-significant signal and one reference signal, both signals being generated during the same stroke of the oscillatory movement, and providing a value representing the mean value of the velocity of the oscillatory movement during the period of time between the generation of the two signals and calculating the distance in question from the measured time distance, from the known distance between the position of the first sensor at which the reference signal is generated and the first marking and from the mean value of the velocity.

28 Claims, 4 Drawing Figures

METHOD AND APPARATUS FOR THE MEASUREMENT OF THE LENGTH OF A STRAIGHT LINE OR AN ARC

FIELD OF THE INVENTION

The invention concerns a method and apparatus for measurement of the length of a straight line or of an arc.

BACKGROUND OF THE INVENTION

Method and apparatus are known which are capable of measuring the length of a straight line or of an arc. These are used in industry where a machine part either moves back and forth along a linear path, or rotatably about an axis of revolution relative to a fixed part of the machine where the instantaneous position of the movable machinepart is either continuously determined or at predetermined times. In such methods and apparatus the length of a straight line or of an arc is determined by measuring from an arbitrarily defined point at the movable machine part to a fixed predetermined zero point or an arbitrarily determined reference point.

A marking carrier, i.e. for example either a linear scale several meters long or a generally circular scale displaying a plurality of markings is connected with one of the bodies. The markings on the scale are spaced apart in direction of relative movement of the bodies, i.e. linearly or angularly and generally constitute narrow strips or lines extending perpendicularly to the direction of relative movement of the bodies. The other body (the one not provided with the scale) carries a scanning device having a movable measuring sensor adapted to "read" the markings and to generate a signal for each marking it "reads".

The distance of a predetermined point on the body carrying the scanning device from a reference or zero point defined at the other body is the linear or arcuate length to be measured and is determinable by the scanning device. To accurately determine the linear or arcuate length use is made of an index line extending perpendicular to the direction of the relative linear movement and radially through the center of rotation for rotary relative movement. This index line is associated with and determined by the fixed position of a second measuring sensor of the sensing device. It is the spacing of this index line from the zero point of the relative movement which is to be determined.

For highest accuracy and resolution capacity, it has been the practice to provide the linear scale (or the circular scale) with the greatest number of scale markings possible, which makes the width of the markings critical, because it must be made as small as possible, with uniformity of spacing therebetween. The markings must also be as perpendicular as possible to the direction of relative movement of the bodies.

Methods for measurement of an angle or a length of an arc and for measurement of a linear length are known from U.S. Pat. No. 4,449,191 and DE-OS No. 3018527. In the methods of these publications, a rotary movement, which is independent of the relative movement of the two bodies and the angular speed of which is constantly measured, occurs between the marking carrier to be scanned and the measuring sensor of the scanning device. While the methods of the publications employ cheap marking carriers, having comparatively few markings and of relatively great width, and without adhering to uniformity of spacing between the markings and alignment precision, nevertheless afford high measurement accuracy. Here, the marking strips are individually recognized and their spacing precisely measured in a calibration run by measurement of the time distance of the electrical signals generated by the measuring sensor of the scanning device. Through comparison of the calibrated values thus obtained and stored, with the corresponding time distance values obtained during the measuring operation and taking into account the instantaneous speed of rotation, the marking spacing can be determined, its accuracy depending on the accuracy of the time measurement. The length-measuring method of DE-OS No. 3018527 operating on the foregoing principle, has the disadvantage that it requires a complex arrangement for achieving good measurement results. This will be appreciated from the fact that in this publication the linear scale to be scanned is stationary and the relative rotational movement is such that the measuring sensor of the scanning device always moves on a circular path and periodically passes over a predetermined part of the linear scale. Moreover, high measurement accuracy can only be obtained if the rotational speed of the measuring sensor is precisely known and is constant during the measurement operation so that an expensive synchronous motor must be used for the rotational movement. Also a rotary scale rotating with the measuring sensor must be employed which has a plurality of markings scanned by a second measuring sensor fixedly connected to the body carrying the scanning device to measure and monitor the angular speed of the measuring sensor and the circular scale co-rotated therewith. Since, with this method, the markings of the rotating scale disc must likewise be individually identified, their angular spacings must be measured in calibration runs, constantly repeated, and the thus obtained calibration values stored for later comparison with the instantaneously obtained time measured spacing values, requiring thereby expensive data processing components. Beyond that, the radius of the circular path in which the rotating measuring sensor is moved should be as large as possible to minimize measurement error, which otherwise could only be avoided by performing corrective arithmetic operations. In this case, the scanning device is necessarily large and unwieldly so that sealing of internal parts from the surrounding atmosphere becomes difficult if not impossible. Also providing electrical connections for rotating electronic components present a problem especially where the rotating measuring sensor, for obvious reasons, is not to be disturbed.

In the method disclosed in U.S. Pat. No. 4,449,191 it is the circular disc that rotates at high speed so that the above named problems do not occur. However, it is necessary to maintain accurate constant rotational movement. Beyond that, the different marking groups are scanned with two sensors, requiring extensive data-processing. Here also the overall system structure is necessarily large because two groups of markings must be provided on separate rotating scales.

SUMMARY OF THE INVENTION

The invention in consideration of the foregoing is directed to a method and apparatus which are simpler in concept for making measurements of the linear or arcuate length of movement between two relatively movable bodies. More specifically, the method and apparatus of the invention involve simpler and more compact structure and data-processing thereby sharply reducing costs without sacrificing accuracy of measurement.

In practicing the invention, it is to be understood the spacing of each of the markings on the marking carrier (linear scale or circular disc) from a predetermined zero point is precisely known. Hence, the marking carrier need not be manufactured with precision. In fact, the markings on the carrier may be comparatively wide lines, spacing between which need not be identical. Each of the markings is individually scanned and identified and its spacing from the respective neighboring marking is determined by calibration measurements, which are carried out by the apparatus of the invention with an accuracy corresponding to that employed for time-measurements, more fully hereinafter described. In this way, the exact distance of each marking from the zero point of relative movement can be determined and stored in memory.

Identification of the markings, through obtained calibration values, production of "punctiform" idealized marks from actual markings of finite width and time span measurement between a reference signal (produced when the oscillating sensor has a predetermined position with respect to the index line, for example, has a distance zero from that line) and the time-significant signals (associated with the markings on the fixed scale) are accomplished, in the practice of this invention, in accordance with the teachings of the aforementioned publications.

This means that, if for a given position of the first body with respect to the second body, the distance between the index line on the first body and the zero point on the second body is to be determined, only the distance between the index line and the nearest marking on the first marking carrier has to be measured and that the resulting measurement value has to be added to (or subtracted from) the known distance between said nearest marking and said zero point.

The just mentioned measurement is done in accordance with the invention, by substituting rotational movement of the known methods by an oscillatory to and fro movement which the measuring sensor of the scanning device executes in a direction parallel to the direction of the relative movement of the two bodies, especially in respect to the marking carrier immovably connected to the other body, even for measurements of arc length. This oscillatory movement, as distinguished from the known rotary described movement, is characterized by having a non-uniform speed between two reversal points, since the oscillating measuring sensor attains substantially zero speed at each of the reversal points between which the measuring sensor is first accelerated and then braked again.

Furthermore, during at least one of the strokes of the oscillatory movement the time is measured which the oscillating sensor needs to move from the marking on the first marking carrier to a position in which, in the most preferred case, its center line coincides with the index line. By multiplying the corresponding measured time value by the mean value of the speed of the oscillating sensor the geometrical distance between the nearest marking on the first marking carrier and said index line is obtained with high accuracy.

More specifically, if the oscillating measuring sensor at time $t_1$ provides a signal when it passes over a marking on the fixed scale from which the index line has a spacing d to be determined and the mentioned reference signal is generated when the median measuring line associated with the oscillatable sensor coincides with the index line at the time $t_2$, then $$d = (t_2 - t_1)\bar{v} = \Delta t \cdot \bar{v} \qquad (1)$$

where $\bar{v}$ is the effective mean speed of the oscillatory system in the time span $\Delta t$ and since the value of $\bar{v}$ and $\Delta t$ are determinable, the distance d can be readily determined.

In the oscillatory system according to the invention, preferably driven by a sinusoidal excitation signal during each oscillation cycle, the sinusoidal signal has an acceleration phase, a braking phase and a reversing phase between the acceleration phase and the braking phase of each oscillatory stroke there is a short period of time during which the velocity of the oscillatory movement, is essentially constant. If an amplitude of oscillatory movement is provided which is sufficiently large with respect to the spacing of the markings on the first marking carrier, the time span $\Delta t$ in equation (1) will fall into the period of time wherein the speed of oscillation is constant. Hence, the effective mean value $\bar{v}$ in equation (1) can be replaced by a constant speed term $v_o$.

A long term constant value for $v_o$ is not required since it is possible, according to the invention, to measure either the speed $v_o$ directly, or another parameter characteristic of this speed for each oscillation stroke and to use the corresponding value thus obtained in conjunction with time span $\Delta t$, determined during such oscillation stroke, for the calculation of d according to equation (1).

For producing the reference signal preferably a second marking carrier, co-oscillating with the oscillating measuring sensor is provided and, is scanned by a second measuring sensor which is fixedly secured to the body carrying the scanning device. This second marking carrier, in contrast to prior methods, is not a large scale disc having a plurality of markings, but instead comprises, for example, a small glass scale in the shape of a platelet and which aside from the marking, serving for the generation of the reference signal, also has at least two further markings so arranged that from the signals produced by the second sensor in response to the passage of these further markings an accurate measure of the constant speed of oscillation, $v_o$ is obtainable.

The second marking carrier has a marking corresponding to the median measuring line of the oscillating sensor serving for the generation of the reference signal and being provided in the center of the second marking carrier. This median marking is so related to the median measuring line of the oscillating sensor so as to coincide as nearly as possible therewith. The second sensor, as previously indicated, is fixed to the body carrying the scanning device so that its median measuring or center line coincides with the index line the distance of which from the nearest marking on the first marking carrier is to be determined.

By virtue of the above described construction of the second marking carrier, as a small light-weight platelet, it is possible to maintain the mass of the overall oscillatory system very small enabling thereby use of a high oscillation frequency and enabling obtention of a large number of measuring values per unit of time from which mean values can be determined with high accuracy.

The electromagnetic coils used for the oscillatory movement and the bearing and movement guidance arrangements employed for the oscillatory system also permit the overall structure to be compact, moreover enabling exclusion of dirt, dust and moisture from inner parts of the oscillatory system. The electrical connection for the to and fro movement of the oscillating sensor and for its associated light source as well as their associated electrical circuits present no problem. Since the second marking carrier has only a small number of markings, the identification of which is readily possible and of which substantially only the spacing between two of the markings must be precisely known and stored (serving as they do for the determination of the time span characterizing the speed $v_o$). Data-processing is also simplified with the advantage that small data-processing components may be used.

The two markings serving to provide a value characterizing the speed $v_o$ are advantageously provided on the second marking carrier symmetrically with respect to the center of the oscillating second marking carrier and spaced on either side thereof. The distance of each of these two markings from the center of the second marking carrier is so selected that at predetermined nominal amplitude of the oscillatory movement the speed of the oscillatory system is essentially constant in the time span elapsing in each oscillation stroke, between the movement of the forward marking in a given direction and the movement of the rearward marking in the same direction past the second measuring sensor. If a time span $t_o$ is measured for both resulting signals, generated during an oscillation stroke and associated with the two markings under discussion, then $$v_o = s_o/t_o \quad (2)$$

and the speed $v_o$ can be determined since $s_o$ is determinable, being the measured spacing of the two markings on the second marking carrier. If one introduces equation (2) into equation (1), then one obtains $$d = s_o \Delta t/t_o \quad (3)$$

It will be seen from the foregoing, the spacing d is determinable with the accuracy of measurement of the marking spacing $s_o$, the time span $\Delta t$ and $t_o$.

Since the constancy of $v_o$ is assured between the two markings only when the maximum amplitude of the oscillatory movement exceeds a predetermined minimum value, this condition is constantly monitored. This monitoring is effected according to the invention with the aid of two further markings, which are situated on the second marking carrier so spaced from the center thereof that they move past the second measuring sensor shortly before and shortly after the maximum amplitude of the oscillatory system is reached.

Advantageously, these last two mentioned markings can be provided on the second marking carrier differently spaced from the center thereof so that one of the markings will generate two pulses, on passing through an oscillation reversal point associated with it, that have different time spacing from the two pulses generated by the other marking on traversal of its reversal point. The different time spacings between the respective pairs of pulses provide information concerning the direction of the oscillatory movements. This information is important because it provides information as to whether the measured spacing d must be added to or subtracted from the known spacing of the scanned marking of the first marking carrier from zero point of the relative movement in order to determine the spacing of the index line, associated with the second sensor, from the zero point.

Figure 4:
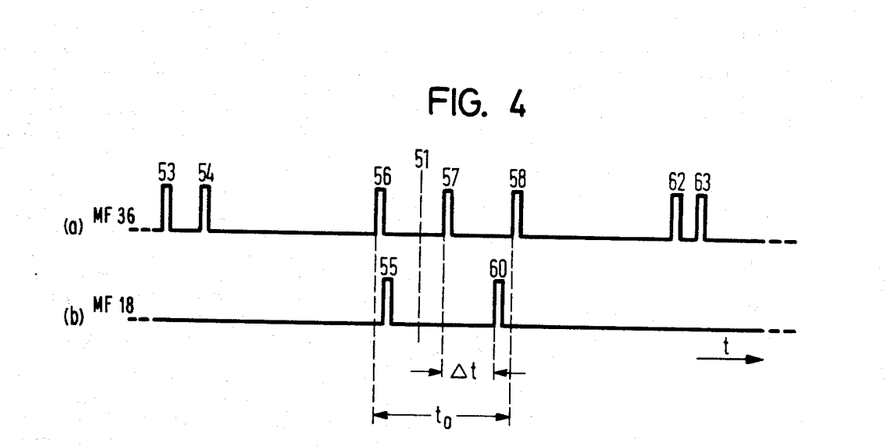
FIG. 4 is a pulse diagram showing a series of pulses produced as a function of time for explaining the operation of the device of FIG. 3.

Particularly accurate measurements are obtained if the markings on the first marking carrier are arranged with respect to one another so that the first measuring sensor passes over two of these markings in the time span, in which the speed $v_o$ of the oscillatory system is constant, spacing from the reference signal being then measured; see FIG. 4 where pulses 55 and 60 are produced within the time span of production of pulses 56 and 58 which represent that portion of the oscillatory system where the speed $v_o$ is substantially constant. It will be appreciated that the index line between two markings on the fixed carrier defines two distances d1 and d2, the sum of which is equal to the spacing between the two markings on the fixed scale; i.e. the fixed marking carrier, the respective distances d1 and d2 being determinable in relation to the index line of the body carrying the sensing device, when the relatively movable bodies are not moved during measurement. This approach can be used either for checking the measurement values obtained or for determination of the speed of relative movement of the bodies.

In the above discussion, generation of the reference signal, measurement of the instantaneous velocity of oscillation and monitoring the maximum amplitude of the oscillatory movement was considered to be performed by means of a second marking carrier oscillating together with the first sensor and an associated second measuring sensor fixed to the body carrying the scanning equipment. This arrangement can be reversed without departing from the principles of the invention in that also the second measuring sensor can be fixed to the oscillatory system for oscillating therewith while the second marking carrier can be fastened to the body.

When the first marking carrier is a linear scale, which as mentioned may be of appreciable length, it is advantageous for the attainment of a dust-tight and moisture-free arrangement to dispose the linear scale in the interior of a substantially U-shaped hollow profile, or body, which is closed off at both ends, for example, by sealing end plates, while its open side is closed by two sealing bodies, fillable with a medium under pressure and which in the filled state is at such a pressure that the bodies are sealed against the ingress of dust or moisture into the interior of the hollow body. In this case, the relatively movable body carrying the scanning device is provided with an arm at the tip end of which the scanning device of the invention is fastened. This projecting arm extends between both sealing bodies into the interior of the hollow profile so that the linear scale disposed therein may be scanned by the scanning device carried thereby. By providing the arm with appropriate wedge surfaces, the sealing bodies will seal thereagainst without disturbing the seal between the sealing bodies during displacement in the longitudinal direction of the hollow profile.

BRIEF DESCRIPTION OF THE DRAWING

The invention is described in the following with reference to an exemplary embodiment of the invention with respect to the accompanying drawings, in which.

BRIEF DISCLOSURE OF A PREFERRED EMBODIMENT OF THE INVENTION

While the following disclosure is made with respect to measurement of length of a straight line, as will be seen from the following, the method and apparatus are equally applicable to measuring the length of an arc. In fact, it is intended that FIGS. 1 and 2 portray both linear and angular relative movement between two bodies and this would be the case if FIG. 1 is viewed as an exploded developed view of two bodies relatively movable with respect to each other in angular direction.

Figure 1:
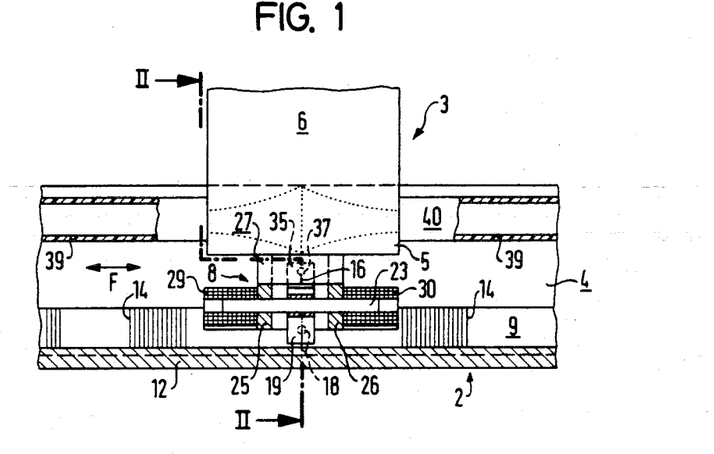
FIG. 1 is a top plan view of a device, according to the invention, for the scanning of a linear scale, seen in the direction of arrows I—I of FIG. 2, all parts of the device above the line indicated by arrows I—I of FIG. 2 being cut away.
Figure 2:
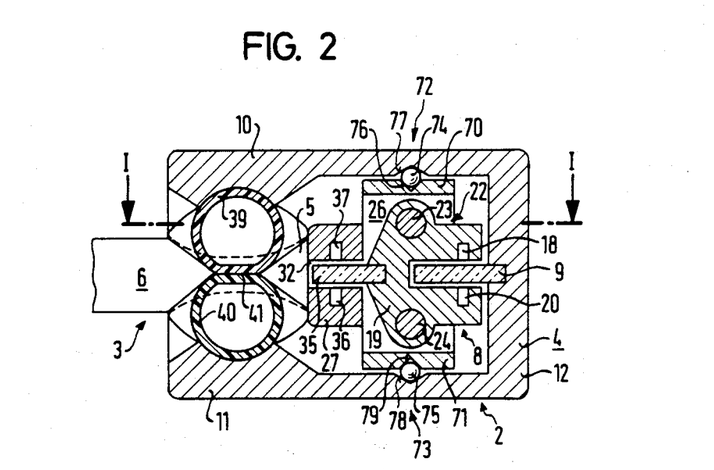
FIG. 2 is on an enlarged scale a vertical section through the device along line II—II of FIG. 1, however including those parts which are cut away in FIG. 1.

FIGS. 1 and 2 illustrate bodies 2 and 3 which are movable relative to each other in direction of the double arrow F and of which the first is formed by a long, substantially U-shaped profile 4 extending in direction of the double arrow F and the other comprises an arm 6, which extends perpendicularly to the longitudinal direction of the hollow profile 4 and projects at its free end 5 into the interior space of the hollow profile. At free end 5 there is carried a scanning device 8 which scans a marking carrier, in the form of a linear scale 9 extending substantially the entire length of the hollow profile and projects from the profile rear wall 12 toward arm 6. The rear wall 12, together with upper and lower walls 10 and 11 constitute the U-shaped profile extending along the arrow F. The linear scale 9 is provided with a plurality of markings 14, spaced along direction F enabling measurement of the distance of arm 6 from a zero point (not shown in the figures), on scale 9, to which zero point the relative movement of body 3 with respect to body 2 is related.

In a specific application, the hollow profile 4 can be connected, for example, with an elongate machine frame, while the arm 6 is connected to a machine carriage movable relative to and along the machine frame.

Figure 3:
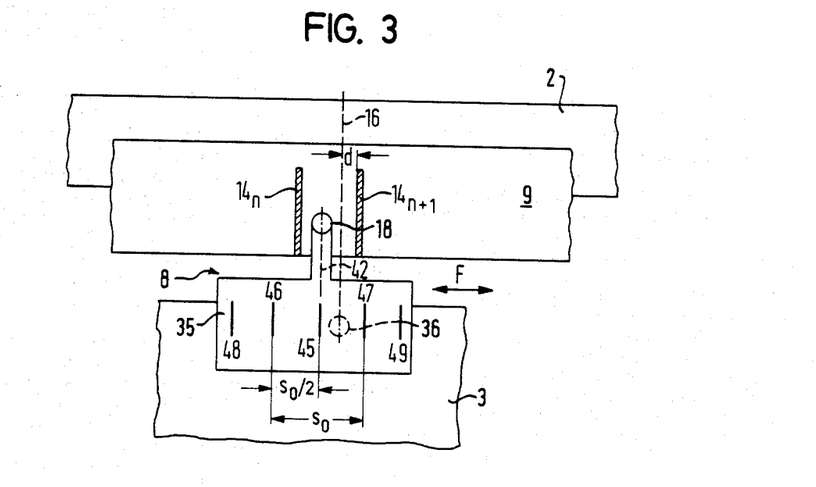
FIG. 3 is an enlarged schematic illustration of a part of the linear scale and of the scanning device associated therewith.

The markings 14 on scale 9, as seen in FIGS. 1 and 3, are narrow spaced apart strips oriented substantially perpendicularly to the direction of linear movement of body 3. The light permeability of the markings 14 differs from the light permeability of the carrier 9 carrying the markings.

These markings 14 can therefore be scanned by measuring sensor 18 of the scanning device 8, which sensor in the illustrated embodiment is a differential photodiode which, as seen in FIG. 2, is mounted on one of the legs of a measuring sensor carrier, to one side of linear scale 9, while a light source 20 is disposed on the other side of the linear scale in the oppositely disposed leg of the measuring sensor carrier 19 so that the light source 20 and the measuring sensor 18 are about substantially perpendicularly oriented to the surface of marker carrier 9.

The measuring sensor carrier 19 is firmly carried by two parallel rods 23 and 24 extending in the direction of movement of body 3, the free end portions of the rods being supported in slide bearings in both legs 25 and 26 of a bearing block 27 of U-shaped configuration as viewed in FIG. 1. As also seen in FIG. 1, both legs 25 and 26 of the block 27 embrace the measuring sensor carrier 19 and the block 27 is rigidly mounted at the front end 5 of arm 6. Legs 25 and 26 of block 27 are spaced from each other a distance sufficient to ensure freedom for oscillatory movement of measuring sensor carrier 19 between legs 25 and 26.

Oscillatory movement of the measuring sensor carrier 19 is effected by electromagnetic coils 29 and 30 arranged on opposite sides of the measuring sensor carrier 19, more specifically on opposite sides of legs 25 and 26. The upper rod 23 consists of a ferromagnetic material and projects, as seen in FIG. 1, at its free ends as a core into coils 29 and 30 and thus can be moved together with the sensor carrier 19 carried thereby to and fro in direction of the arrow F on energizing these coils 29 and 30 with an appropriate electrical signal. The electrical circuit energizing the coils 29 and 30 have not been shown in the drawing in the interest of clarity of illustration of the other component parts of the apparatus.

Because of the continuous oscillatory movement of the measuring sensor carrier 19 in direction of the arrow F, the light from the light source 20 passes to the measuring sensor 18 as light pulses formed when the light alternately passes the light impermeable markings 14 and the light-permeable spaces therebetween, whereby to modulate the light from the light source even when no relative movement takes place between bodies 2 and 3, due to the oscillating movement of sensor carrier 19.

The lower rod 24 can merely serve for guidance of sensor carrier 19 during its oscillatory movement as does also rod 13. Rod 24 could however also consist of a ferromagnetic material and enter, as a core, into further electromagnetic coils which then would provide an electrical signal related to the oscillatory movement of the oscillatory element 22. The evaluation of the oscillatory movement related signal can provide, for example, the effective mean oscillation speed $\bar{v}$ of a predetermined portion of each oscillation stroke.

The bearing block 27, as seen in FIG. 2, has a part lying in a region between the forward end 5 of arm 6 and the measuring sensor carrier 19, this part being formed with a slot 32, which is horizontal in FIG. 2. The slot extends in direction of movement of sensor carrier 19 which carries a second marking carrier 35 which extends parallel to the first marking carrier 9. As thus connected, the second marking carrier co-oscillates with measuring sensor 18. This second marking carrier 35 is preferably constructed as a small platelet having, as explained in detail below, markings 45 to 49 (see FIG. 3) which have a light permeability different from that of the intervening regions therebetween. The markings are preferably formed as narrow lines extending perpendicular to the direction of oscillatory movement of measuring sensor 18 and thereby to the direction of displacement of the body 3 relative to body 2.

The markings 45 to 49 on carrier 35 are scanned by a second measuring sensor 36, likewise a differential photodiode so mounted in the bearing block 27, beneath the slot 32, that the light from light source 37 is substantially perpendicular to the surface on marking carrier 35, hereinafter referred to as the second marking carrier, carrying the markings 45 to 49.

By virtue of the oscillatory movement of the second marking carrier 35 in direction F, the light-permeable markings 45 to 49 and the light-impermeable zones therebetween cause a series of light pulses to be produced during this second scanning when the marking carrier 35 moves between the second measuring sensor 36 and its light source 37, whereby to modulate the light from the light source.

Light-emitting diodes such as LED's or Laser diodes may be used as light sources 20 and 37.

In the end regions of upper and lower walls 10,11, facing arm 6, are hoses 39 and 40 which are fillable with a fluid under pressure. These hoses extend the entire length of the hollow profile 4 and at their ends, not shown in FIG. 1, sealingly engage the end faces of profile 4 which cover the lateral extent of the hollow profile. The cross-sectional dimensions of the hoses 39 and 40 are such that, in the filled state, they engage along surface 41 to close off the interior of the hollow profile 4 in air-tight and dust-tight manner. The arm 6, in the region in which it passes between hoses 29 and 30, is provided with wedge-shaped surfaces which are represented in FIG. 1 by dotted lines to facilitate insertion into hollow profile 4. Sharp edges are avoided and the arm 6 has its least thickness at the left and right side edge, as seen in FIG. 1, the thickness increasing to its maximum thickness at the center of arm 6.

Although the hoses 39 and 40 are pressed apart by means of these wedge-shaped surfaces of the arm passing between them, and deformed as seen in FIG. 2, the hoses 39 and 40 seal against the wedge surfaces of the arm 6 in such manner as to seal off the interior profile space during movement of arm 6 in direction of the arrow F, over the entire length of the hollow profile 4. This permits utilization of the method and apparatus of the invention in hostile environments.

For the sake of clarity, the upper hose 39 has in FIG. 1 its sectional showing interrupted in the region of the arm 6 to show the other hose 40.

Both legs 25 and 26 of the bearing block 27 are interconnected at their upper and lower end, by connecting web 70 and 71 (see FIG. 2) extending in direction of the linear movement of body 3. V-shaped grooves 76 and 79, extending in direction of the linear movement, are formed in these webs and are so arranged that a line connecting the grooves coincides with a line interconnecting the centers of rods 23 and 24. Both grooves 76 and 79 receive a plurality of balls, of which only one pair, namely an upper ball 74 and a lower ball 75 is illustrated in FIG. 2. To retain these balls entrained in grooves 76 and 79 during the linear movement of the arm 6 in direction of the arrow F, two further V-shaped grooves 77 and 78 are provided in upper and lower walls 10 and 11. The balls in the respective grooves define linear ball bearings 72 and 73.

The angles of the grooves 77 and 78 are more obtuse than the angles of grooves 76 and 79. With this arrangement, slip of the balls 74 and 75 occurs in the grooves 76 and 79 while assuring uninhibited rolling of the balls 74 and 75 in the grooves 77 and 78 of the hollow profile 4. This ensures exact, and easily movable guidance of the bearing block 27 with respect to profile 4.

Compared to the described embodiment entailing measurement of rectilinear relative movements between two bodies 2 and 3, an arrangement for angular movement differs from the described embodiments mainly in that in place of the linear scale 9, a circular or ring-shaped scale is scanned. The circular scale can be mounted on one of the bodies; i.e. body 2 concentrically with the rotational axis of the relative movement. The other body: i.e. body 3 then carries a scanning arrangement similar to scanner 8 and is so arranged that the index line 16 shown in FIG. 3 intersects the rotational axis as a radius line. To avoid the need for conversion of marking spacings measured along a straight line by calculation to arc spacings in the case of a scale disc of small radius, the above described scanning system can be so modified that the first measuring sensor moves to and fro on a part-circular path, the center of which lies in the rotational axis of the relative movement. Since no recilinear displacements occur in this case, between the stationary marking carrier and its scanner, the entire system can be accommodated in a closed housing and sealed off from hostile environmental influences. Here also the housing will have very small dimensions because of the use of only one scale disc and of the relatively small size of the oscillating scanner.

FIG. 3 shows in schematic form and on an enlarged scale, both bodies 2 and 3 movable relative to each other as well as the marking carrier 9 secured to body 2 and the scanning device 8 secured to body 3. Only two of the markings 14, namely marking $14_n$ and $14_{n+1}$, are represented on the marking carrier 9.

The body 3 is so positioned with respect to the body 2 that a line extension of the index line from the differential photodiode, constituting the second measuring sensor 36 at the body 3, has a spacing d from, for example, the marking $14_{n+1}$.

Disposed above the measuring sensor 36, as viewed in FIG. 3, is the oscillatory system, of which only the oscillating first measuring sensor 18 and the second marking carrier 35 operatively connected with it are represented schematically in FIG. 3. For the sake of greater clarity, the bearing and drive devices for the oscillatory system have been omitted from the FIG. 3 showing.

The center line 42 of the oscillating first measuring sensor 18 is arranged to coincide with the center of the oscillatory system including measuring sensor 18 and second marking carrier 35. The oscillatory system is constructed symmetrically with respect to this center.

Disposed on the second marking carrier 35 in the present case is a first marking 45 which also coincides with the center line 42 of sensor 18 and causes, when it passes during the described oscillatory movement the center line of the stationary second measuring sensor 36, generation of a reference signal which characterizes the zero deflection of the oscillatory system and also indicates that measuring sensor 18 goes through a position in which it has zero distance from index line 16 so that the distance of the first measuring sensor 18 from marking $14_{(n+1)}$ is identical with the distance of index line 16 from marking $14_{(n+1)}$ at that moment.

To the left and right of the marking 45, serving for the generation of the reference signal, are two further markings 46 and 47, each being spaced $s_o/2$ from the first marking 45 so that the spacing between markings 46 and 47 equals $s_o$. This spacing is very accurately determined, at least once by any known method, for example, interferometrically, using a measuring microscope or with a device of the type described in DE-OS No. 3018528. In the latter case, the entire circular scale (having a plurality of markings) is initially accurately measured and then divided into individual sectors, each of which is provided with markings, the spacing between which is thus very accurately known. In any case, spacing between the markings 46 and 47 is so chosen with respect to the distance of the reversal points of the oscillatory movement that for a period of time, during each oscillatory stroke, elapsing between the passage of the first one and the passage of the second one of these markings over index line 16, the speed of oscillation can be regarded as substantially constant.

Marking carrier 35 is also provided with markings 48 and 49 near the left hand and right hand edge of carrier 35 and so arranged thereon that they pass over the median measuring line of the stationary measuring sensor 36 shortly before and shortly after the oscillatory system passes through its reversal point only when the oscillatory system experiences a deflection beyond a predetermined amplitude, thus assuring constancy of the speed of oscillation during the indicated time span.

The markings 48 and 49 may be arranged somewhat asymmetically with respect to the center of the marking carrier 35 so that the double pulse 53, 54 produced by marking 48 during its passage of the reversal point associated with it, has a different spacing from that of the double pulse 62, 63 generated by the other marking 49 on the passage of the other reversal point; see FIG. 4. The direction of the oscillatory movement can be deduced from these time differences.

Recorded in a time base diagram in FIG. 4(a) are the signals generated by the stationary measuring sensor 36 and in FIG. 4(b) the signals generated by the oscillating measuring sensor 18 which signals, as shown, are generated when the oscillatory system oscillates out of the position shown in FIG. 3 further to the right to the reversal point lying there. The dashed line 51 in FIG. 4 corresponds essentially to the time fix of the FIG. 3 showing: i.e. to an instantaneous stopping of the movement of the oscillatory system.

Illustrated to the left of the dashed line 51 in the first line of FIG. 4 are the signals 53 and 54, which were generated by the stationary measuring sensor 36 or a transmitter therebehind on the passage through the preceding reversal point of the oscillatory system by the marking 49.

Because of the movement of the oscillatory system starting from this preceding reversal point and going towards the position shown in FIG. 3, at first the forward one of the markings 46 and 47; i.e. the marking 47, passes the center line of the stationary measuring sensor 36. This is illustrated in FIG. 4(a) by the pulse-shaped signal 56 to the left of the line 51. The next signal 57 is generated when because of the continuing movement towards the right the central marking 45 passes the measuring sensor 36. This signal 57 is the reference signal above explained. The reference signal 57 is followed by a further pulse-shaped signal 58, generated by the marking 46, during this rightward stroke. Between the signals 56 and 57, the oscillating measuring sensor 18 passes over the marking 14$_n$, which is represented in FIG. 4(b) by the corresponding pulse 55. After the signal 57, the oscillating measuring sensor 18 passes the marking 14$_{n+1}$ of the stationary marking carrier 9, giving rise to measuring sensor signal 60, shown in FIG. 4(b).

As explained in detail above and indicated once again in FIG. 4, the time span $\Delta t$ between the reference signal 57 and the measuring sensor signal 60 and the time span $t_o$ between pulse-shaped signals 56 and 58 on the other hand are measured. The sought spacing d is obtainable from equation (3) from these measured values and the known geometric spacing $s_o$ of the markings 46 and 47 associated with the signals 56 and 58.

By subtraction of the value d from the spacing of marking 14$_{n+1}$ from the zero point of the relative movement between both bodies 2 and 3, which spacing of 14$_{n+1}$ from the zero point is known, the distance of the index line 16 to the zero point can be determined.

Illustrated to the far right in FIG. 4(a) are two further pulse-shaped signals 62 and 63 generated by the measuring sensor 36 during passage of marking 48 shortly before and shortly after the passage of the oscillatory system through the second reversal point. As is clearly evident from FIG. 4, the time spacing between the pulse-shaped signals 62 and 63 is smaller than the corresponding time spacing between the pulse-shaped signals 53 and 54, which is due to the fact that the associated markings 48 and 49 are differently spaced from the marking 45 at the center of the oscillatory system. By means of these different time spacings, it is possible to determine the direction of the oscillation stroke.

Moreover, the time spacings between the signals 53 and 54 and that between signals 62 and 63 must not fall below predetermined minimum values for if they do it would be because the oscillatory system does not oscillate at maximum amplitude which assures the constancy of the value $v_o$ in the time span $t_o$.

According to a further embodiment, the second measuring sensor is mounted at the measuring sensor carrier 19 so that its measuring line coincides with that of the first measuring sensor 18. In this case, the second marking carrier is fixedly secured to body 3 against oscillatory movement for scanning by the second measuring sensor during its oscillatory movement. Preferably, the marking for generation of the reference signal on this second marking carrier is again arranged to generate this signal precisely when the oscillatory system passes through its zero or center position. In this case, this marking then at the same time also defines the index line which in FIG. 3 is spaced by distance d from an adjacent marking. This embodiment in all other respects is identical to the embodiment previously described.

It is evident from FIG. 3 that the device according to the invention can readily be adapted for use for measurement of arc length or angles. In that case, the rotational axis would be perpendicular to the plane of the drawing in FIG. 3 and around which bodies 2 and 3 may be relatively moved with respect to each other. The first marking carrier 9 could, for example, be constructed as a circular disc, about the outside of which the scanning device 8 would move. Conversely, the marking carrier 9 could be in the form of a disc-shaped circular ring in which case the inside edge of the ring would cooperate with the measuring sensor carrier.

I claim:

1. A method for measuring the distance between a first marking which is provided on a first body and at least one second marking which is one of a plurality of markings provided on a first marking carrier which is fixedly connected to a second body, said bodies being movable with respect to each other, comprising
   (a) providing a first sensor movably attached to said first body and being adapted during its movement to sense each marking of said plurality of markings;
   (b) imparting oscillatory movemeht to said first sensor for oscillatory movement thereof with respect to said first body independent of the relative movement of said two bodies, said first sensor moving to and fro between two reversal points in a direction being essentially parallel to the direction of relative movement of said two bodies and crossing said at least one second marking at each to and fro stroke of said oscillatory movement;

(c) generating at each crossing by said first sensor of said at least one second marking, a time-significant signal correlated in time to the crossing event;

(d) generating a reference signal for each to and fro stroke of said oscillatory movement of the first sensor when the latter is predeterminatally related to said first marking;

(e) measuring the distance, as a function of time, between said time-significant signal and said reference signal during at least one of the strokes of said oscillatory movement;

(f) providing a value, representing the mean value of the velocity of said oscillatory movement, between the generation of said time-significant signal and said reference signal; and (g) determining from step (c) to (f) the unknown distance between said first and said second marking.

2. A method as claimed in claim 1, wherein said oscillatory movement is sinusoidal with respect to time.

3. A method as claimed in claim 2, wherein said first marking on the first body is at the center of said oscillatory movement of said first sensor, both reversal points of said oscillatory movement having the same distances from said first marking.

4. A method as claimed in claim 3, wherein said reference signal is generated when the distance between said first sensor and said first marking is zero.

5. A method as claimed in claim 1, wherein the step of generating the reference signal further comprises providing a second marking carrier means having at least one marking thereon, and a second sensor means, for sensing said at least one marking on said second marking carrier, one of said means being connected with said first sensor for oscillatory movement therewith, fixedly connecting the other of said means to said first body, and generating said reference signal each time the at least one marking on said second marking carrier means crosses the second sensor.

6. A method as claimed in claim 5, wherein the step of providing a value representing said mean value of the velocity of said oscillatory movement further comprises providing two further markings on said second marking carrier means, each being on opposite sides of said at least one marking and equally spaced therefrom in the direction of said oscillatory movement, generating further time-significant signals when said second sensor means senses said two further markings, measuring the distance as a function of time, between said further time-significant signals which are produced during at least one forward or at least one backward stroke of said oscillatory movement, and calculating said mean value from said measured distance and the known distance of said two further markings on said second marking carrier means.

7. A method as claimed in claim 6, wherein the distance of said two further markings is chosen with respect to the distance of the reversal points of the oscillatory movement so that the velocity of the oscillatory movement is essentially constant in the time span between generation of said two further time-significant signals.

8. A method as claimed in claim 1, wherein the step of imparting an oscillatory movement to said first sensor further comprises the step of monitoring whether the distance of the two reversal points does not fall below a predetermined value.

9. A method as claimed in claim 1, wherein the step of imparting oscillatory movement to said first sensor comprises the step of generating a signal indicative of whether the oscillatory movement is a forward or a backward stroke.

10. A method as claimed in claim 1, wherein the distance between said two reversal points of said oscillatory movement is selected with respect to the distance between each pair of adjacent second markings on said first marking carrier so that, in any relative position of the two bodies, said first sensor passes over two of said second markings on said first marking carrier with an essentially constant velocity during each forward and during each backward stroke of said oscillatory movement, whereby during each of these strokes two time-significant signals are generated, said method comprising measuring the distance as a function of time between one of said two time-significant signals and said reference signal as well as the distance as a function of time between the other one of said two time-significant signals and said reference signal, and calculating the distance between said first marking on said first body and one of said two second markings on said first marking carrier as well as the distance between said first marking on said first body and the other of said two second markings on said first marking carrier from (a) a predetermined distance between said position of said first sensor at which position said reference signal is generated and said first marking (b) from the measured distances as a function of time and (c) from the mean value of the velocity of the oscillatory movement.

11. A method of measuring the linear or angular distance between a first marking provided on a first body and a zero marking on a marking carrier carrying a plurality of second markings and being fixedly connected to a second body, the two bodies being relatively movable with respect to each other, comprising measuring the distance between said first marking and at least one of said second markings according to the method as claimed in claim 1, identifying said at least one of said second markings, providing a memory storing the distances of all said second markings on said first marking carrier from said zero marking, deriving the distance between said at least one identified second marking and said zero marking, and calculating the distance between said first marking and said zero marking by adding the measured distance to said distance derived from said memory.

12. A method according to claim 11, for measuring the length of a linear or angular movement of one body relative to another body, one of said bodies being provided with a first marking and the other body being provided with a marking carrier having a zero marking and a plurality of second markings and being fixedly connected to said second body, comprising measuring the distance of said first marking from said zero marking before said first body starts its movement with respect to said second body, measuring the distance of said first marking from said zero marking after said first body has terminated its movement with respect to said second body, and calculating the length of movement of said first body by deducting the one of said measured distances from the other.

13. An apparatus for measuring the distance between a first marking which is provided on a first body and at least one second marking which is one of a plurality of markings provided on a first marking carrier which is fixedly connected to a second body, the two bodies being relatively movable with respect to one another, said apparatus comprising a scanning device fixedly attached to said first body and movably carrying an oscillatory element comprising a first sensor adapted to sense each marking of said plurality of markings, a driving means for effecting oscillatory movement of said oscillatory element which is independent of the relative movement of said two bodies, whereby said first sensor moves to and fro between two reversal points in a predetermined direction essentially parallel to the direction of said relative movement of said bodies and senses said at least one second marking during each forward and each backward stroke of said oscillatory movement, a time-significant signal being generated each time said first sensor crosses over said at least one second marking, which time-significant signal is correlated in time to the crossing over event, means for generating a reference signal at each backward and at each forward stroke of said oscillatory movement when said first sensor is in a position having a predetermined relation to said first marking, means providing a measure of the time distance between said time-significant signal and said reference signal during at least one backward or at least one forward stroke of said oscillatory movement, means for providing a value representing the mean value of the velocity of said oscillatory movement between the generation of said time-significant signal and said reference signal, and calculating means for calculating the unknown distance between said first and said second marking from distance between said position of the first sensor and said first marking, from the measured time distance between said time-significant signal and said reference signal and from said mean value of the velocity of the oscillatory movement.

14. An apparatus as claimed in claim 13, wherein said scanning device comprises a bearing block fastened to said first body for carrying said oscillatory element and guiding said oscillatory movement thereof and includes at least one rod extending in the direction of said oscillatory movement and a sensor carrier fastened to the rod having free ends supported by a slide bearing in said bearing block.

15. An apparatus as claimed in claim 14 wherein said driving means comprises at least one electromagnet for inducing said oscillatory movement, said rod consisting of ferromagnetic material and being constructed as an armature of said at least one electromagnet.

16. An apparatus as claimed in claim 15, wherein said electromagnet comprises a coil into which one of the ends of the rod projects as core.

17. An apparatus as claimed in claim 15, wherein said driving means comprises two electromagnetic coils on the rod, one at each end and into each of which projects the ends of the rod as a core, a second rod being provided as a guidance element for guidiug said sensor carrier and being parallel to said first rod, said second rod having its ends likewise slidingly guided in the bearing block.

18. An apparatus as claimed in claim 14, wherein said first sensor is so fastened at said sensor carrier that the measuring line of said first sensor extends through the center of the oscillatory movement when the oscillatory element is in its undisplaced center position.

19. An apparatus as claimed in claim 13, wherein said means for generating a reference signal comprises a second marking carrier having at least one marking thereon and being connected to said oscillatory element for oscillatory movement therewith, and a second sensor, fixedly secured to said first body, said reference signal being generated each time said at least one marking on said second marking carrier crosses the position of said second sensor.

20. An apparatus as claimed in claim 19, wherein said means for providing a value representing said mean value of the velocity of said oscillatory movement comprises two further markings provided on said second marking carrier, which two further markings are arranged symmetrically with respect to the marking which serves for the generation of the reference signal, and being equally spaced from this marking in direction of the oscillatory movement.

21. An apparatus as claimed in claim 13, comprising monitoring means including two further markings on said second marking carrier, said markings being positioned on said carrier so that in passing said second sensor shortly before and shortly after the traversal of one of the reversal points of the oscillatory movement, signals are generated signifying that the distance of the reversal points are above a predetermined minimum value.

22. An apparatus as claimed in claim 21, wherein said two further markings are arranged on said second marking carrier for generation of signals characterizing the direction of the oscillatory movement, said signals comprising double pulses, each double pulse being associated with one cf the two further markings and exhibiting different distances between the two pulses of each double pulse.

23. An apparatus as claimed in claim 14, wherein the first marking carrier is a linear scale, being arranged in the interior of an elongated substantially U-shaped hollow sealed profile, sealed by two hose-shaped sealing bodies, fillable with a pressurized medium, and extending over the entire length of an opening leading to the interior of the elongate hollow profile, the cross-sectional dimensions of the sealing bodies being such that they engage each other in said filled state to tightly seal off the interior space of the hollow profile from the external atmosphere, the scanning device being fastened to an arm of said first body, said arm extending into said hollow profile between said sealing bodies.

24. An apparatus as claimed in claim 23, wherein said bearing block is guided within the hollow profile by means of at least one linear ball bearing assembly.

25. An apparatus as claimed in claim 24, wherein said at least one linear ball bearing assembly comprises a first elongate V-shaped groove extending in the direction of linear movement of the scanning device in a surface of said bearing block, and a second elongate V-shaped groove, also extending in the direction of linear movement of the scanning device over the entire length of the hollow profile in a surface thereof, which surface is directly opposite and parallel to said surface of the bearing block, and roller balls fitted in said V-shaped grooves of said bearing block and said hollow profile.

26. An apparatus as claimed in claim 25, wherein the V-angle of the groove in the bearing block is more acute than the V-angle of the groove in the hollow profile.

27. An apparatus as claimed in claim 24, wherein a second linear ball bearing assembly is provided identical in all respects to said one linear ball bearing assembly and being arranged opposite and parallel to said one linear ball bearing assembly.

28. An apparatus as claimed in claim 13, further comprising means for identifying said at least one second marking on said first marking carrier, the distances of all markings of said plurality of second markings from a zero marking being stored and retrieved when said distance determination is to be made, and calculating means for calculating the distance between said first marking and said zero marking by adding the measured distance to the distance retrieved from storage.

* * * * *